(12) United States Patent
Trombley et al.

(10) Patent No.: US 9,037,349 B2
(45) Date of Patent: May 19, 2015

(54) TRAILER IDENTIFICATION SYSTEM FOR TRAILER BACKUP ASSIST

(71) Applicant: Ford Global Technologies, Dearborn, MI (US)

(72) Inventors: Roger Arnold Trombley, Ann Arbor, MI (US); Thomas Edward Pilutti, Ann Arbor, MI (US); Erick Michael Lavoie, Dearborn, MI (US); Christopher Nave, Ypsilanti, MI (US); John Shutko, Ann Arbor, MI (US); Rich Lanoue, Harlem, GA (US); Bradley G. Hochrein, Dexter, MI (US); Nate Rolfes, Oak Park, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/010,644

(22) Filed: Aug. 27, 2013

(65) Prior Publication Data

US 2015/0066296 A1 Mar. 5, 2015

(51) Int. Cl.
*G07C 5/08* (2006.01)
*B62D 13/06* (2006.01)

(52) U.S. Cl.
CPC . *G07C 5/08* (2013.01); *B62D 13/06* (2013.01)

(58) Field of Classification Search
USPC .......................................................... 701/41
See application file for complete search history.

(56) References Cited

U.S. PATENT DOCUMENTS

| 4,277,804 A | 7/1981 | Robison |
|---|---|---|
| 4,897,642 A | 1/1990 | Dilullo |
| 5,142,278 A | 8/1992 | Moallemi |
| 5,247,442 A | 9/1993 | Kendall |
| 5,282,641 A | 2/1994 | McLaughlin et al. |
| 5,579,228 A | 11/1996 | Kimbrough et al. |
| 5,905,433 A | 5/1999 | Wortham et al. |
| 5,999,091 A | 12/1999 | Wortham |
| 6,501,376 B2 | 12/2002 | Dieckmann |
| 6,687,609 B2 | 2/2004 | Hsiao et al. |
| 7,142,098 B2 | 11/2006 | Lang |

(Continued)

FOREIGN PATENT DOCUMENTS

| DE | 3923676 A1 | 1/1991 |
|---|---|---|
| DE | 19526702 A1 | 2/1997 |

(Continued)

OTHER PUBLICATIONS

Best Convenience & Productivity http://www.google.co.in/url?sa=t&source=web&cd=8&ved=OCHUQFIAH&url=http%3A%2F%www.ford.com%2Fservices%2Fcars-proxy%2FNG85%2Fpdf%2Fpdf_8801F25B-7761-8299-E913-42ECE91343EC.pdf&rct=j&q=%22new%20trailer%22%20information%20through%20RFID%20tag%20to%20vehicle&ei=LrOnTsb_EYHprAfhh8GvCO&usg=AFQjCNEvvrTdLg42rcyE67wuJPc1SWRJ3g&cad=rja.

(Continued)

*Primary Examiner* — Mary Cheung
*Assistant Examiner* — Anne Mazzara
(74) *Attorney, Agent, or Firm* — Angela M. Brunetti; Raymond Coppiellie (57) ABSTRACT

A system and method for configuring a trailer backup assist system. The system and method communicates predetermined trailer parameters, which are embedded on a tag attached to the trailer, to a controller in the trailer backup assist system. A trailer backup assist system is configured using the predetermined trailer parameters and the configured trailer backup assist system is activated to operate using the trailer parameters.

17 Claims, 3 Drawing Sheets

(56) References Cited

U.S. PATENT DOCUMENTS

| | | |
|---|---|---|
| 7,175,194 B2 | 2/2007 | Ball et al. |
| 7,760,077 B2 | 7/2010 | Day et al. |
| 7,825,782 B2 | 11/2010 | Hermann et al. |
| 7,950,751 B2 | 5/2011 | Offerle et al. |
| 8,165,770 B2 | 4/2012 | Getman et al. |
| 8,179,238 B2 | 5/2012 | Roberts et al. |
| 2004/0026510 A1* | 2/2004 | Cheung et al. ............. 235/462.1 |
| 2008/0303648 A1* | 12/2008 | Day ............................. 340/431 |
| 2009/0271078 A1 | 10/2009 | Dickinson |
| 2010/0156667 A1 | 6/2010 | Bennie |
| 2011/0281522 A1 | 11/2011 | Suda et al. |
| 2012/0200706 A1 | 8/2012 | Greenwood et al. |

FOREIGN PATENT DOCUMENTS

| | | |
|---|---|---|
| EP | 0849144 A2 | 6/1996 |
| EP | 1312492 | 5/2003 |
| FR | 2515379 A1 | 10/1981 |
| WO | WO 8503263 A1 | 8/1985 |
| WO | WO 00/44605 A1 | 8/2000 |

OTHER PUBLICATIONS

RFID Read/Write Module http://www.grandideastudio.com/portfolio/rfid-read-write-module/.

SkyBitz http://www.skybitz.com/products-services/hardware/bat-xtndr/.

* cited by examiner

TRAILER IDENTIFICATION SYSTEM FOR TRAILER BACKUP ASSIST

TECHNICAL FIELD

The present invention relates to a method for identifying a trailer towed by a vehicle and more particularly to a method for identifying a trailer being controlled by a trailer backup assist system on the vehicle, storing a trailer configuration that is specific to the identified, trailer in the trailer backup assist system, and applying the stored trailer configuration to a control algorithm in the trailer backup assist system.

BACKGROUND

Vehicles are often used to pull a trailer, and it is common for a vehicle owner to have more than one trailer. The vehicle towing a trailer may be outfitted with multiple systems that aid a driver in towing and/or backing a trailer. Such vehicle systems have control algorithms that rely on knowledge of certain parameters associated with the trailer in order for the algorithms to function properly or in a robust manner. In particular, a trailer back up assist system assists a driver in steering a vehicle with a trailer attached. The trailer backup assist system has a control algorithm that relies on specific trailer parameters, many of which are fixed parameters such as a trailer identifier that is unique to the trailer being towed by the vehicle, an effective tongue length, and an overall length of the trailer.

Therefore, in order to function properly, a trailer backup assist system must be informed about and configured for the toiler parameters that are specific to the trailer that is attached. Currently, to identify a trailer and input trailer specific parameters to the trailer backup assist system, a driver is required to enter several trailer measurements into the trailer backup assist system using a Human Machine Interface (HMI) by scrolling through characters, screens, etc. to enter measurement information that is required by the algorithms of the trailer backup assist system, assign a trailer name, etc., attach a target to the trailer, calibrate the trailer backup assist system, and activate the trailer backup assist system to begin backing the trailer.

Once the trailer information has been entered into the system a first time, it can be saved, or stored, by the trailer backup assist system for future use by the driver. In this case, upon attachment of the trailer to the tow vehicle, a driver may be required to scroll through screens once the trailer backup system is initiated to find and select the proper trailer that has been attached to the trailer and apply the correct trailer parameters to be used by the trailer backup assist system. Again, the target on the trailer is used for scaling, calibrating, and other functions that ensure the trailer backup assist system functions properly.

A drawback associated with this method for entering and identifying trailer information is that driver intervention is always required in order to properly measure the necessary trailer parameters, correctly enter the parameters into the trailer backup assist system, and configure the trailer backup assist system, to operate in accordance with the particular trailer parameters. Often, this is done at the time the trailer is attached and the driver may be rushed to input the necessary information, the driver may not have the proper equipment to take the necessary measurements, or the information may be entered improperly by the driver. Furthermore, even if the driver records the relevant trailer data, the data must be entered each time the trailer is attached. Driver error, or a driver's failure to update the information in the trailer backup assist system should a different trailer be attached to the vehicle, may result in the trailer backup assist system using information that prevents the system from operating at optimum capacity.

Alternatively, the trailer backup assist system may "sense" a trailer is attached when a wire harness from the trailer is plugged into a hitch mechanism on the vehicle. The wire harness powers brake lights, turn signals and driving lights. In systems associated with trailer towing, sensing a wire harness may be interpreted to mean that a trailer is connected. This may also be used for the trailer backup assist system. Again, the system may "sense" when a trailer is attached, but the driver is required to scroll through a list of possible trailer configurations to identify the particular trailer and apply the trailer configuration to the trailer backup assist system. A drawback associated with this method of recognizing that a trailer is attached to the vehicle is that the vehicle may be outfitted with a hitch mounted, vanity sign or light that will interfere with trailer detection by way of a harness and result in a "false" indication, or the trailer backup assist system may recognize that a trailer has been attached, but may not recognize which particular trailer is attached, or that a new or different trailer has been attached.

There is a need in a trailer backup assist system for a method of recognizing that a trailer has been attached to the vehicle, identifying the particular trailer that has been attached to the vehicle, communicating the necessary trailer parameters associated with the attached trailer to the trailer backup assist system, configuring the trailer backup assist system with the correct trailer parameters. Additionally, there is a need for providing a driver with the ability to name and store the trailer configuration for future towing events associated with, the particular trailer. There is also a need for a method that does not rely on driver intervention or introduce the potential for "false" sensing. There is a further need for a method that, upon recognition and identification of the trailer that has been attached to the vehicle, retrieves a stored trailer configuration for selection and identification to the trailer backup assist system so that the control algorithm of the trailer backup assist system will correctly implement trailer backup assist functionality for the particular trailer being backed by the vehicle without relying on the driver to input, select, and configure the trailer parameters to be used by the trailer backup assist system.

SUMMARY

The present invention provides a system and method for configuring a trailer backup assist system. The system and method communicates predetermined trailer parameters, which are embedded on a tag attached to the trailer, to a controller in the trailer backup assist system. The trailer backup assist system is configured using the predetermined trailer parameters and the trailer backup assist, system is activated to operate using the trailer parameters.

In one embodiment of the inventive subject matter a readable tag, located on die trailer, is identified and read by a reader on the vehicle. The reader communicates with a controller of the trailer backup assist system and the trailer backup assist system is configured using predetermined trailer parameters that are read from the readable tag.

The trailer backup assist system may recognize the trailer configuration being read from the tag and a trailer configuration that is stored in controller memory may be selected to configure a control algorithm associated with the trailer backup assist system.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter. The inventive subject matter may be directed to a trailer and a tow vehicle equipped with a trailer backup assist system having a trailer path curvature control algorithm for trailer backup assist as described in U.S. Patent Application Publication No. 2012-0271515 A1, now U.S. Pat. No. 8,909,416, incorporated herein by reference.

Figures 1, 5:
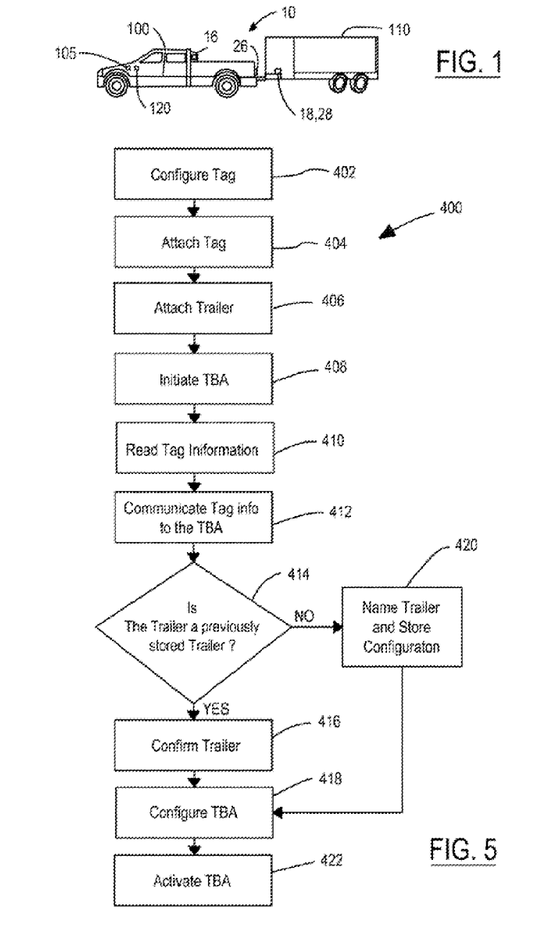
FIG. 1 shows a vehicle-trailer combination configured with a trailer backup assist system having trailer identification capabilities of one embodiment of the inventive subject matter.
FIG. 5 is a flow chart for the method of the inventive subject, matter for identifying a trailer configuration that is to be used by a trailer backup assist system.

FIG. 1 shows a tow vehicle 100 which is connected to a trailer 110. The trailer 110 may be in communication with various vehicle systems, including, but not limited to, a trailer backup assist system 105 which includes a control module 120 on the tow vehicle. Communication between the trailer 110 and the control module 120 may be accomplished through hard wired connections, such as a wire harness, or wireless communication. The control module 120 on the tow vehicle provides trailer backup assist functionality for controlling curvature of a path of the trailer attached to the vehicle. The driver inputs a desired trailer path curvature using a trailer backup steering input apparatus, not shown in FIG. 1, as the backup maneuver of the vehicle and trailer progresses. Kinematical information of a system defined by the vehicle and the trailer are used to calculate a relationship between the trailer's curvature and a steering angle of the vehicle. Steering commands corresponding to the steering angle changes are used for controlling a steering system of the vehicle for implementing steering angle changes of the steered wheel to achieve the specified path of travel of the trailer.

Figure 2:
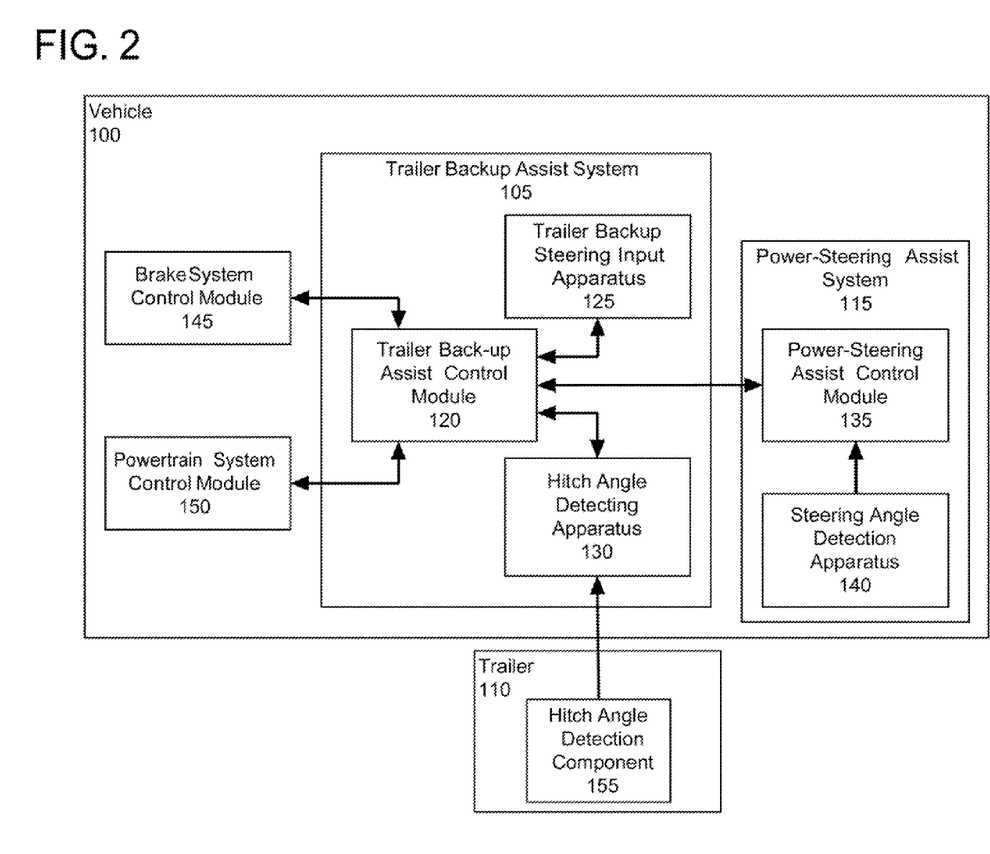
FIG. 2 shows a block diagram of a vehicle configured with a trailer backup assist system having trailer identification capabilities with a trailer attached thereto.

Referring now to FIG. 2, trailer backup assist system 105 is described. The trailer backup assist system 105 includes the trailer backup assist control module 120, a trailer backup steering input apparatus 125, and a hitch angle detecting apparatus 130. The trailer backup assist control module 120 is connected to the trailer backup steering input apparatus 125 and the hitch angle detecting apparatus 130 for allowing communication of information between modules. The trailer backup assist control module 120 is attached to a power-steering assist control module 135 of a power assist steering system 115 for allowing information to be communicated between modules. A steering angle detection apparatus 140 of the power-steering assist system 115 is connected to the power-steering assist control module for providing information thereto. The trailer backup assist system is also attached to a brake system control module 145 and a powertrain control module 150 for allowing communication of information between the modules. Jointly, the trailer backup assist system 105, the power-steering assist system 115, the brake system control module 145 and the powertrain control module 150 define a trailer backup assist architecture configured in accordance with an embodiment of the inventive subject matter.

The trailer backup assist control module 120 is configured to receive information from the trailer backup steering input apparatus 125, the hitch angle detecting apparatus 130, the power-steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detecting apparatus 130, the power-steering assist control module 135, the brake system control module 145, and the powertrain control module 150. Thereafter, the vehicle steering information is provided to the power-steering assist control module 135 for affecting steering of the vehicle 100 by the power-steering assist, system 115 to achieve a commanded, path of travel for the trailer 110.

The trailer backup steering input apparatus 125 provides the trailer backup assist control module 120 with information defining the commanded path of travel of the trailer 110 to the trailer backup assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight, path, of travel).

The power-steering assist control module 135 provides the trailer backup assist control module 120 with information relating to a rotational position (e.g., angle) of the steering wheel angle and/or a rotational position (e.g., turning angle(s)) of steered wheels of the vehicle 100. In certain embodiments of the inventive subject matter, the trailer backup assist control module 120 can be an integrated component of the power steering assist system 115. For example, the power-steering assist control module 135 can include a trailer back-up assist, algorithm for generating vehicle steering information as a function of all or a portion of information received from the trailer backup steering input apparatus 125, the hitch angle detecting apparatus 130, the power-steering assist control module 135, the brake system control module 145, and the powertrain control module 150.

It is disclosed herein that information from the trailer backup steering input apparatus 125 preferably includes toiler path curvature information characterizing a desired curvature for the path of travel of the trailer, such as provided by the trailer backup steering input apparatus 125 discussed above in reference to FIGS. 1 and 2. In this manner, the operation for receiving the trailer backup information, signal can include receiving trailer path curvature information characterizing the desired curvature for the path of travel of the trailer. Received trailer information is used to determine vehicle steering information.

It is disclosed herein that the operation for determining vehicle steering information for providing the requested change in curvature of the trailer's path of travel preferably includes determining vehicle steering information as a function of trailer path curvature information contained within the trailer backup information signal. Determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified frailer path curvature.

Referring again to FIG. 1 and one embodiment of the inventive subject matter, the trailer 110 is equipped with a tag, such as an electronic tag 18 that transmits, as by radio frequency, a signal containing information relative to the trailer 110. The signal provided from the electronic tag contains information about trailer parameters that are fixed in nature and specific to the trailer being identified and useful to the trailer backup assist system 12, such as a unique trailer identification code, an overall trailer length, an overall tongue length, and a maximum towing capacity, in another embodiment of the inventive subject matter, the tag 28 is a Quick Response Code (QRC) that contains a code embedded with the information about the trailer parameters. The information that is communicated by or obtained from the tag 18, 28 are trailer parameters that are useful to a control algorithm that uses a kinematic model so that the trailer backup assist system can control the trailer as desired by the driver.

Figure 3:
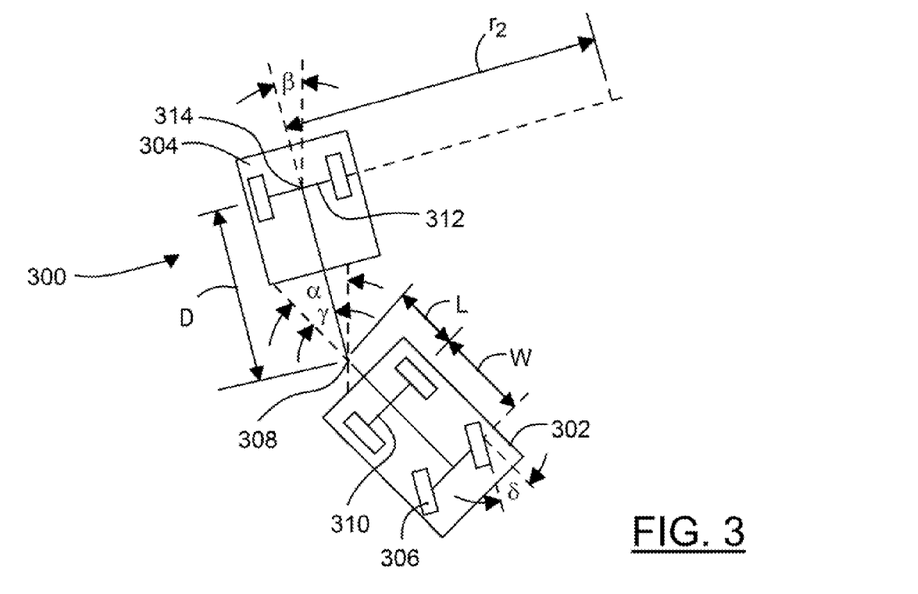
FIG. 3 is a diagrammatic view showing a kinematic model configured for providing information utilized by a trailer backup assist system in accordance with the inventive subject matter.

Turning now to FIG. 3 and a discussion of a kinematic model used to calculate a relationship between a curvature of a path of travel of a trailer and the steering angle of a vehicle towing the trailer, a low order kinematic model can be desirable for a trailer back-up assist system configured in accordance with some embodiments of the inventive subject matter. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, tires of the vehicle and the trailer having negligible (e.g., no) deformation, actuator dynamics of the vehicle being negligible, the vehicle and the trailer exhibiting negligible (e.g., no) roll or pitch motions.

A kinematic model 300 for a system defined by a vehicle 302 and a trailer 304 is based on various parameters associated with the vehicle 302 and the trailer 304. These kinematic model parameters include:

$\delta$: steering angle at steered front wheels 306 of the vehicle 302;

$\alpha$: yaw angle of the vehicle 302;

$\beta$: yaw angle of the trailer 304;

$\gamma$: hitch angle ($\gamma=\beta-\alpha$);

W: wheel base of the vehicle 302;

L: length between hitch point 308 and rear axle 310 of the vehicle 302;

D: length between hitch point 308 and axle 312 of the trailer 304; and r2: curvature radius for the trailer 304.

The kinematic model 300 of FIG. 3 reveals a relationship between trailer path radios of curvature r2 at the midpoint 314 of an axle 306 of the trailer 304, steering angle $\delta$ of the steered wheels 306 of the vehicle 302, and the hitch angle $\gamma$. As shown in the equation below, this relationship can be expressed to provide the trailer path curvature $\kappa 2$ such that, if $\gamma$ is given, the trailer path curvature $\kappa 2$ can be controlled based on regulating the steering angle $\delta$ (where $\dot{\beta}$ is trailer yaw rate and $\dot{\eta}$ is trailer velocity.

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

Or, this relationship can be expressed to provide the steering angle $\delta$ as a function of trailer path curvature $\kappa 2$ and hitch angle $\gamma$, $$\delta = \tan^{-1}\left(\frac{\left(W + \frac{KV^2}{g}\right)[\kappa_2 D\cos\gamma - \sin\gamma]}{D L \kappa_2 \sin\gamma + L\cos\gamma}\right) = F(\gamma, \kappa_2, K)$$

Accordingly, for a particular vehicle and trailer combination, certain kinematic model parameters (e.g., D, W and L) are constant and assumed known. The inventive subject matter is directed to a system and method for identifying the trailer that is attached and automatically providing parameters that are constant and assumed known for the identified trailer. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $\kappa 2$ is determined from the driver input via a trailer backup steering input apparatus 125. Through the use of the equation for providing steering angle, a corresponding steering command can be generated for controlling a steering system (e.g., an actuator thereof) of the vehicle.

Figure 4:
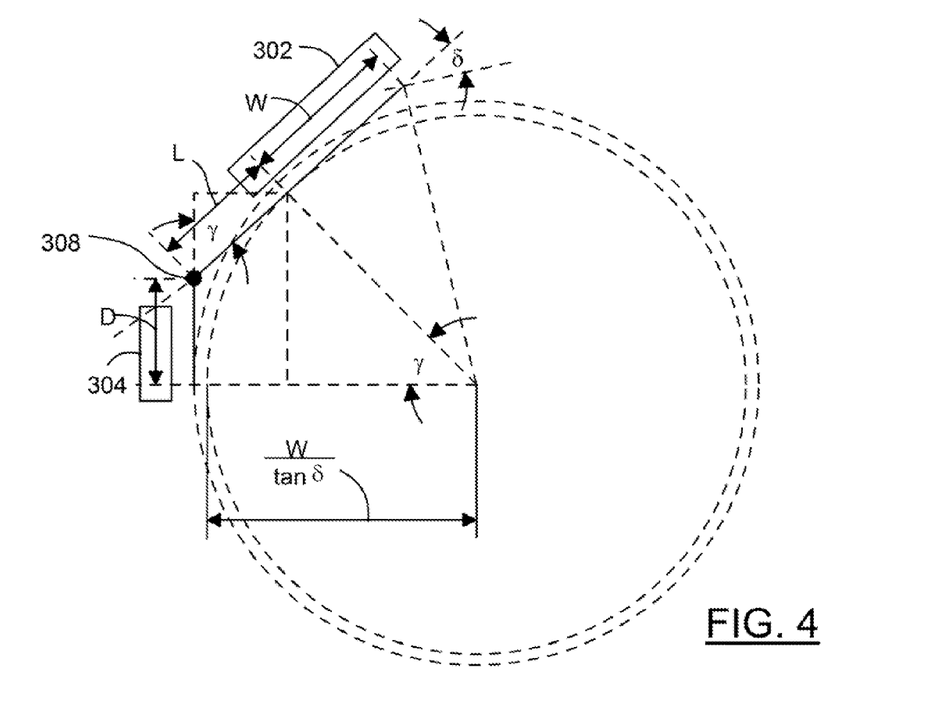
FIG. 4 is a diagrammatic view showing a relationship between hitch angle and steered angle as it relates to trailer backup assist.

FIG. 4 shows an example of a trailer path curvature function plot 400 for a trailer backup steering input apparatus (e.g., the trailer backup steering input apparatus 125 discussed in FIG. 2). A value representing a trailer path curvature (e.g., $\kappa_2$) is provided as an output signal from the trailer backup steering input apparatus 125 as a function of user input movement. In this example, a curve 402 specifying trailer path curvature relative to user input (e.g., amount of rotation) at an input device (e.g., a knob) is defined by a cubic function. However, a skilled person will appreciate that embodiments of the inventive subject matter are not limited to any particular function between a magnitude and/or rate of input at a trailer backup steering input apparatus (e.g., knob rotation) and a resulting trailer path curvature value.

Referring again to FIG. 3, it is desirable to limit the potential for the vehicle 302 and the trailer 304 to attain a jackknife angle (i.e., the vehicle/trailer system achieving a jackknife condition). A jackknife angle $\gamma(j)$ refers to a hitch angle $\gamma$ that cannot be overcome by the maximum steering input for a vehicle such as, for example, the steered front wheels 306 of the vehicle 302 being moved to a maximum steered angle $\delta$ at a maximum rate of steering angle change. The jackknife angle $\gamma(j)$ is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the axle 312 of the trailer 304. When the hitch angle γ for the vehicle 302 and the trailer 304 achieves or exceeds the jackknife angle γ(j), the vehicle 302 must be pulled forward to reduce the hitch angle γ. Thus, for limiting the potential for a vehicle/trailer system attaining a jackknife angle, it is preferable to control the yaw angle of the trailer while keeping the hitch angle of the vehicle/trailer system relatively small.

Referring to FIGS. 3 and 4, a steering angle limit for the steered front wheels 306 requires that the hitch angle γ cannot exceed the jackknife angle γ (j), which is also referred to as a critical hitch angle. Thus, under the limitation that the hitch angle γ cannot exceed the jackknife angle γ(j), the jackknife angle γ (j) is the hitch angle γ that maintains a circular motion for the vehicle/trailer system when the steered wheels 306 are at a maximum steering angle δ(max). The steering angle for circular motion with hitch angle is defined by the following equation.

$$\tan \delta_{max} = \frac{W \sin \gamma_{max}}{D + L \cos \gamma_{max}}$$

Solving the above equation hitch angle allows jackknife angle γ(j) to be determined. This solution, which is shown in the following equation, can be used in implementing trailer backup assist functionality in accordance with the inventive subject matter for monitoring hitch angle in relation to jackknife angle.

$$\cos \overline{\gamma} = \frac{-b \pm \sqrt{b^2 - 4ac}}{2a}$$

where, $$a = L^2 \tan^2 \delta(max) + W^2;$$

$$b = 2 LD \tan^2 \delta(max); \text{ and}$$

$$c = D^2 \tan^2 \delta(max) - W^2.$$

It is clear from the above description of the trailer backup assist system that control trailer curvature during backing of the trailer by the vehicle that certain parameters about the trailer that is being towed are important to the algorithm. For example, the effective tongue length, the overall length of the trailer, the overall width of the trailer, and a unique identifier for each trailer that is to be towed need to be known to the system in order for the algorithm to function properly.

Referring again to FIG. 1, the inventive subject matter is a trailer identification system 10 that is integrated with the trailer backup assist system 105 to recognize, identify and associate a particular trailer 110 with the trailer backup assist system 105. The system 10 has a reader 16, 26 that is in communication, wireless or otherwise, with the trailer backup assist control, module 120. The system 10 also has an informational tag 18, 28 that is strategically located on the trailer 110 so that when the trailer 110 is attached to the vehicle 100 and the tag 18, 28 is within range of the reader 16, 26 the trailer 110 will be recognized, identified, the parameters will be communicated to the trailer backup assist system 105 and the trailer backup assist system 105 will be configured with the appropriate trailer parameter information.

In one embodiment, shown in FIG. 1, of the inventive subject, matter, the reader 16 is a Radio Frequency Identification (RFID) reader and the tag 18 is an RFID tag. The RFID tag 18 is an electronic tag that is programmed, or otherwise configured, to contain key trailer parameters that need to be communicated to the trailer backup assist system. Upon the trailer 110 being connected to the vehicle 100, the electronic tag 18 is within range of the electronic reader 16. The electronic reader 16 on the vehicle senses a transmission from the electronic tag 18 on the trailer 110 and communicates the information provided by the electronic tag 18 to the trailer backup assist controller 14 on the vehicle 100.

The electronic tag 18 may be supplied by a trailer manufacturer to include all the relevant parameters and is set in the factory. In the alternative, the electronic tag 18 may be an after-market item, applied by the trailer owner, in which case, the electronic tag 18 is configurable by the trailer owner. The trailer owner may configure the tag with relevant trailer information before attaching the tag to the trailer. The tag configuration is preferably done at a time when the trailer owner can consult a manual for the trailer or take accurate trailer measurements. The configurable tag 18 is programmable using an RFID writing device. The RFID writing device allows the trailer owner to enter and store data to the configurable tag 18, then attach the tag 18 to the trailer. The electronic tag 18 is configured to contain all the relevant trailer information and is linked to the trailer backup assist system. When the trailer is attached to the vehicle 10, the electronic tag 18 becomes within range of the electronic reader 16. The electronic reader 16 reads the relevant information from the tag 18 and the trailer backup assist system is able to either configure itself to accommodate the attached trailer or access the trailer configuration from memory (if the trailer has been previously used and the information has been already stored). Because the trailer owner has ample time to take accurate measurements and enter the data before the tag is attached to the trailer and configured with the relevant data, as opposed to answering prompts at the time the trailer is attached, there is less room for error. Furthermore, the trailer owner only has to enter the trailer parameters associated with the configurable tag one time because it can be linked to the trailer backup assist system and stored for future use whenever the particular trailer is being towed by the vehicle, which increases the chance that the measurements are correct and the appropriate data is being used within the trailer backup assist system. Additionally, the trailer owner will no longer have to confirm which toiler is attached to vehicle as it may be read from the electronic tag The trailer owner may also have the option of taking the vehicle, trailer, and tag to a dealer or service provider who may assist the driver with configuring the tag with the relevant trailer information.

In another embodiment, also shown in FIG. 1, the reader is a rear-view camera 26, in communication with the trailer backup assist system 105, and the tag 28 is a Quick Response Code (QRC). The trailer backup assist system 105 includes a hitch angle detecting apparatus 130 which may be a rear-view camera to track the trailer position. This rear-view camera may be used to recognize the QRC on the trailer 110, identify the trailer 110 and configure the trailer backup assist system with the trailer parameters which would eliminate the need for the customer to enter the measurements and name of the trailer by scrolling through characters using either an HMI or another interface key, such as an arrow key on the steering wheel. The QRC tag 28 is a coded symbol that is embedded with the trailer parameter information. The rear-view camera 26 will snap a picture of the QRC tag that has been attached to the trailer 110. The rear-view camera 26 communicates the image to the trailer backup assist system which processes the image and interprets the QRC. The information is translated to a form that is usable by the control module 120 so that it may be used by the trailer backup assist system 105.

A QR code is a matrix barcode that is an optically machine-readable image that may be placed on a tag 28. The image on the tag 28 is encoded with data and read by the imaging device, such as camera 26. The tag image is interpreted to extract data that is, in turn, used by the trailer backup assist system 105. A customized QRC tag may be purchased and supplied to the trailer owner. A trailer or vehicle manufacturer may offer a feature in which the trailer owner submits the trailer serial number, or other identifier, and is provided with a tag 28 with a QRC that contains all the relevant trailer information.

The customized QRC tag is ordered by a customer and is configured with data provided by the customer. The order may be placed with the tag manufacturer, the trailer manufacturer, and/or the vehicle manufacturer by phone or online. In the alternative, the customer may have a dealer or service provider configure the tag as necessary for the particular trailer. So yet another alternative, the customer may be provided with sticker labels that can be printed using a home computer.

Alternately, a machine readable code may be attached to the trailer that may be configured with the vehicle such that a customer entered trailer name and parameters may be stored in a controller on the vehicle and associated with a code attached to the trailer. Therefore, when the trailer with this code is attached to the vehicle at a later time, the vehicle trailer management system will, recognize the code and apply the stored data to trailer angle detection and/or trailer backup assistance.

In either embodiment, the reader 16, 26 recognizes the tag 18, 28, receives or extracts data, and supplies the data to the trailer backup assist system. Upon receiving the trailer information at the trailer backup assist control module 120, the control module 120 may identify the trailer from a database of known trailer configurations or store the trailer as a new entry to the database of known trailer configurations. It is common for a tow vehicle to be used for more than one trailer. By recognizing a trailer connected to the tow vehicle through recognition of the RFID tag, it is possible to identify a known trailer configuration, resulting in setup, calibration and backup assist control to optimize the performance of the vehicle-trailer combination while the trailer backup assist system is backing the trailer without the need for extensive input by the driver to setup the system.

The method 400 of the present invention is described with reference to a flow chart shown in FIG. 5, A tag, either an RFID tag or a QRC tag, is configured 402 with information about a particular trailer that is relevant to the trailer backup assist system. As discussed above, the configuration 402 of the tag may be done by a trailer or vehicle dealer, by the trailer owner, or it may be a customizable tag that has to be ordered by the trailer owner.

The tag is attached 404 to the trailer in a location that is appropriate for communication with the reader. For example, if a QRC tag is used, it must be placed in an appropriate location that is readable by the rearview camera on the towing vehicle. Likewise, if an RFID tag is being used, the tag mast be placed in an appropriate location that is readable by the RFID reader.

The trailer is attached 406 to the towing vehicle and the TBA system is initiated 408. The TBA system may be initiated by the driver using a Human Machine Interface. Alternatively, the TBA may be initiated upon detection of the trailer when it is attached to the vehicle. Upon initiation of the TBA system, the controller communicates with the reader to read 410 the tag. The tag is read 410 by either the RFID reader on the vehicle, or by the rear-view camera.

The relevant trailer information is communicated 412 to the TBA system. If the trailer has previously been stored 414 in memory, the TBA system will display 416 the known trailer that has been identified, and the driver may confirm the correct trailer has been identified to use as the TBA is configured 418. In the alternative, if the trailer is a new trailer 414, the driver will be presented with the option of naming and storing 420 the trailer configuration. Alternatively, the naming of the trailer could have previously been entered on the RFID tag or the QRC tag and automatically read and stored in the trailer backup assist system upon detection of the tag identifying a new trailer. Upon identification of the attached trailer and configuration 418 of the trailer backup assist system with the appropriate trailer parameters, the trailer backup assist system may be activated 422.

Identifying the trailer and applying a known trailer configuration for trailer backup assist system is advantageous in various ways. For example, the trailer backup assist system may be initiated and calibrated daring start-up for the particular trailer being towed. The system may also communicate the trailer identification to other trailer tow systems, such as an integrated trailer brake controller, that track and store data relevant to the trailer being towed, such as mileage, average speed, maximum speed, etc. The data collected in such a trailer usage profile is useful for scheduling maintenance and for improving general performance characteristics of the trailer and the tow vehicle.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method of configuring a trailer backup assist system for a trailer connected to a tow vehicle having a trailer backup assist system, the method comprising the steps of:
   communicating predetermined trailer parameters embedded on a tag attached to the trailer to a controller of the trailer backup assist system on the tow vehicle;
   configuring the trailer backup assist system with a trailer configuration having the predetermined trailer parameters embedded on the tag; and
   activating the trailer backup assist system to operate with selected trailer configuration.

2. The method as claimed in claim 1 wherein the step of communicating further comprises the step of reading the predetermined trailer parameters from an RFID tag on trailer using an RFID reader on the tow vehicle that is in communication with the trailer backup assist system.

3. The method as claimed in claim 1 wherein the step of communicating further comprises the step of capturing an image of a tag on the trailer using a rear-view camera on the tow vehicle, the tag having a Quick Response Code imaged thereon and the rearview camera being in communication with the trailer backup assist system.

4. The method as claimed in claim 1 further comprising the steps of:
   storing a trailer configuration having the predetermined trailer parameters in a memory of the controller, the trailer configuration being associated with the attached trailer; and
   selecting a stored trailer configuration from the memory.

5. The method as claimed in claim 4 further comprising the step of confirming the selected trailer configuration.

6. The method as claimed in claim 1 further comprising the step of configuring the tag.

7. A trailer backup assist system in a vehicle having a trailer attached thereto, the system comprising:
   a controller;
   a readable tag attached to the trailer and embedded with data representative of trailer parameters; and
   a reader located on the vehicle, the reader is configured to extract the data and communicate the data to the controller for configuring the backup assist system with the data.

8. The system as claimed in claim 7 wherein the readable tag further comprises an RFID tag and the reader is an RFID reader.

9. The system as claimed in claim 7 wherein the readable tag further comprises a tag having a Quick Response Code image and the reader is a rear-view camera.

10. The system as claimed in claim 7 wherein the readable tag is customizable.

11. The system as claimed in claim 7 wherein when the trailer backup assist system is configured with the data read from the tag, the trailer backup assist system becomes active.

12. The system as claimed in claim 7 wherein the controller associated with the trailer backup assist system further comprises a memory and the data representative of the trailer parameters may be stored in memory whereby, upon attaching the trailer to the tow vehicle and the reader extracting the data from the tag, the controller is configured to identify the data from memory and configure the trailer backup assist system using the stored data.

13. The system as claimed in claim 12 wherein when the trailer backup assist system is configured with the data, the trailer backup assist system becomes active.

14. A method of identifying a trailer being backed by a tow vehicle, the method comprising the steps of:
   recognizing the connection of the trailer to the tow vehicle by reading, from a reader on the vehicle, a tag attached to the trailer the tag is embedded with data representative of trailer parameters;
   selecting a trailer configuration stored in memory that is associated with the recognized trailer; and
   configuring a trailer backup assist system using the selected trailer configuration.

15. The method as claimed in claim 14 wherein the step of reading further comprises reading an RFID tag on the trailer using an RFID reader on the vehicle.

16. The method as claimed in claim 14 wherein the step of reading further comprises a camera on the vehicle capturing an image of a Quick Response Code on the tag.

17. The method as claimed in claim 14 further comprising the step of activating the trailer backup assists system upon configuration of the trailer backup assist system.

* * * * *